United States Patent
Tiwari et al.

(10) Patent No.: US 11,212,516 B2
(45) Date of Patent: Dec. 28, 2021

(54) AUTOMATED TEST SYSTEM FOR TESTING REMOTE CONTROL UNITS

(71) Applicant: Contec, LLC, Schenectady, NY (US)

(72) Inventors: Rajeev Tiwari, San Jose, CA (US); Uladzimir Valakh, Troy, NY (US)

(73) Assignee: Contec, LLC, Schenectady, NY (US)

( * ) Notice: Subject to any disclaimer, the term of this patent is extended or adjusted under 35 U.S.C. 154(b) by 0 days.

(21) Appl. No.: 16/576,147

(22) Filed: Sep. 19, 2019

(65) Prior Publication Data

US 2021/0092352 A1    Mar. 25, 2021

(51) Int. Cl.
| | | |
|---|---|---|
| *H04N 17/00* | (2006.01) | |
| *H04R 29/00* | (2006.01) | |
| *H04R 1/04* | (2006.01) | |
| *H04N 21/422* | (2011.01) | |

(52) U.S. Cl.
CPC ....... *H04N 17/00* (2013.01); *H04N 21/42204* (2013.01); *H04R 1/04* (2013.01); *H04R 29/001* (2013.01)

(58) Field of Classification Search
CPC ........ H04N 17/00; H04N 5/4403; H04R 1/04; H04R 29/001
USPC ........ 348/180, 184; 381/56, 58; 324/750.15; 726/2
See application file for complete search history.

(56) References Cited

U.S. PATENT DOCUMENTS

| | | | | |
|---|---|---|---|---|
| 4,152,929 A | * | 5/1979 | Edmond | G01L 1/255 73/581 |
| 4,444,049 A | * | 4/1984 | Hitchcock | F02B 77/08 73/114.28 |
| 5,276,692 A | | 1/1994 | Kwon | |
| 9,091,706 B2 | | 7/2015 | Partee | |
| 9,813,534 B2 | * | 11/2017 | Koltsov | H04W 4/026 |
| 2001/0056544 A1 | * | 12/2001 | Walker | B60R 25/042 726/2 |
| 2005/0101314 A1 | * | 5/2005 | Levi | G08B 21/0238 455/423 |
| 2005/0152557 A1 | * | 7/2005 | Sasaki | H04S 7/302 381/58 |
| 2007/0069756 A1 | * | 3/2007 | Ambler | G01R 31/002 324/750.27 |
| 2009/0111422 A1 | * | 4/2009 | Bremer | H04M 1/72577 455/404.2 |
| 2010/0281178 A1 | | 11/2010 | Sullivan | |
| 2010/0302025 A1 | * | 12/2010 | Script | G08B 25/005 340/539.1 |

(Continued)

OTHER PUBLICATIONS

Tiwari, Rajeev; Non-Final Office Action for U.S. Appl. No. 16/576,177, filed Sep. 19, 2019, dated Apr. 23, 2020, 24 pgs.

(Continued)

*Primary Examiner* — John W Miller
*Assistant Examiner* — Sean N. Haiem
(74) *Attorney, Agent, or Firm* — Taylor English Duma LLP (57) ABSTRACT

Technologies are described herein for enabling the automated testing of remote control units by providing a suitable test station. The test station includes features that allow it to interact with the remote control units inputs, such as buttons and microphone, and outputs, such as IR and RF remote control codes, status LEDs, and audio output. The test station may be controlled by a controller that executes test scripts or other routines that exercise the functionality of the remote control unit as desired.

6 Claims, 12 Drawing Sheets

(56) References Cited

U.S. PATENT DOCUMENTS

| | | | |
|---|---|---|---|
| 2013/0040599 A1 | 2/2013 | Berg et al. | |
| 2013/0212228 A1* | 8/2013 | Butler | H04L 45/54 |
| | | | 709/219 |
| 2014/0187172 A1 | 7/2014 | Partee | |
| 2014/0197857 A1* | 7/2014 | Partee | G01R 1/02 |
| | | | 324/750.15 |
| 2015/0229919 A1* | 8/2015 | Weber | H04N 17/02 |
| | | | 348/184 |
| 2016/0301786 A1* | 10/2016 | Koltsov | H04W 24/00 |
| 2017/0238401 A1* | 8/2017 | Sadwick | F21K 9/235 |
| | | | 315/294 |
| 2018/0036886 A1* | 2/2018 | Jenkinson | G06K 9/00664 |
| 2018/0063569 A1* | 3/2018 | Yu | G06F 3/0416 |
| 2019/0295544 A1* | 9/2019 | Garcia | G06F 40/30 |
| 2020/0005634 A1* | 1/2020 | Shuff | G08G 1/095 |
| 2020/0100162 A1* | 3/2020 | Sallas | H04W 4/80 |
| 2021/0088577 A1 | 3/2021 | Tiwari et al. | |
| 2021/0092541 A1 | 3/2021 | Tiwari et al. | |

OTHER PUBLICATIONS

Tiwari, Rajeev; Non-Final Office Action for U.S. Appl. No. 16/576,177, filed Sep. 19, 2019, dated Aug. 18, 2020, 31 pgs.

Tiwari, Rajeev; Requirement for Restriction/Election for U.S. Appl. No. 16/576,208, filed Sep. 19, 2019, dated May 17, 2021, 20 pgs.

Tiwari, Rajeef; Final Office Action for U.S. Appl. No. 16/576,177, filed Sep. 19, 2019, dated Dec. 18, 2020, 33 pgs.

Tiwari, Rajeev; Notice of Allowance for U.S. Appl. No. 16/576,177, filed Sep. 19, 2019, dated Sep. 13, 2021, 18 pgs.

Tiwari, Rajeev; Non-Final Office Action for U.S. Appl. No. 16/576,208, filed Sep. 19, 2019, dated Jul. 20, 2021, 17 pgs.

Tiwari, Rajeev; Supplemental Notice of Allowance for U.S. Appl. No. 16/576,177, filed Sep. 19, 2019, dated Oct. 25, 2021, 6 pgs.

Tiwari, Rajeev; Notice of Allowance for U.S. Appl. No. 16/576,208, filed Sep. 19, 2019, dated Nov. 9, 2021, 9 pgs.

* cited by examiner

AUTOMATED TEST SYSTEM FOR TESTING REMOTE CONTROL UNITS

CROSS-REFERENCE TO RELATED APPLICATIONS

This application is related to U.S. patent application Ser. No. 16/576,177 entitled "Automated Universal Test System for Testing Remote Control Units," filed on Sep. 19, 2019, and to U.S. patent application Ser. No. 16/576,208 entitled "Systems and Methods for Simultaneously Testing a Plurality of Remote Control Units," filed on Sep. 19, 2019, both of which are filed concurrently herewith and are hereby incorporated by reference in their entireties.

TECHNICAL FIELD

This disclosure relates to systems for testing consumer electronics products. More specifically, this disclosure relates to a test station that can be employed to perform comprehensive testing on multi-function remote control units.

BRIEF SUMMARY

The present disclosure relates to technologies for testing the functionality of remote control units of the type commonly used in conjunction with a variety of consumer electronics products, such as set-top boxes that are supplied to subscribers by pay television service providers. According to some embodiments, a test station for testing remote control units can comprise a plurality of features that allow the test station to be used in conjunction with an automated system for testing a variety of functions associated with the remote control units.

According to further embodiments, a test station comprises a test fixture with features that allow a remote control unit to be precisely positioned and held in place in the test station during the testing process. The test fixture further comprises a plurality of actuators, such as solenoids, that are aligned with buttons on the remote control unit and capable of pressing each of the buttons in response to instructions from a controller. The station further comprises receivers for receiving infrared (IR) and radio frequency (RF) remote control codes that are transmitted by the remote control unit in response to the pressing of each button.

According to further embodiments, a test station can further comprise sensors capable of detecting the color of light emitted by one or more status indicators on the remote control unit and, separately, the presence of light emitted by the buttons when they are illuminated or backlit during use.

According to further embodiments, a test station can further comprise a microphone for detecting tones emitted by a speaker on the remote control unit, and a speaker for providing audio input to a microphone on the remote control unit.

Various implementations described in the present disclosure can comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations can be realized and obtained by means of the systems, methods, features particularly pointed out in the appended claims. These and other features will become more fully apparent from the following description and appended claims, or can be learned by the practice of such exemplary implementations as set forth hereinafter.

BRIEF DESCRIPTION OF THE DRAWINGS

In the following Detailed Description, references are made to the accompanying drawings, which form a part hereof, and show, by way of illustration, specific embodiments or examples. The features and components of the following figures are illustrated to emphasize the general principles of the present disclosure. The drawings herein are not drawn to scale. Like numerals represent like elements throughout the several figures.

DETAILED DESCRIPTION

The present disclosure can be understood more readily by reference to the following detailed description, examples, drawings, and claims, and their previous and following descriptions. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the present devices, systems, and/or methods in their best, currently known aspect. To this end, those skilled in the relevant art will recognize and appreciate that many changes can be made to the various aspects described herein, while still obtaining the beneficial results of the present disclosure. It will also be apparent that some of the desired benefits of the present disclosure can be obtained by utilizing some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to a quantity of one of a particular element can comprise two or more such elements unless the context indicates otherwise.

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about" or "substantially," it will be understood that the particular value forms another aspect. It will be further understood that the endpoints of each of the ranges are significant both in relation to the other endpoint, and independently of the other endpoint.

For purposes of the present disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list.

To simplify the description of various elements disclosed herein, the conventions of "top," "bottom," "side," "upper," "lower," "horizontal," and/or "vertical" may be referenced. Unless stated otherwise, "top" describes that side of the system or component that is facing upward and "bottom" is that side of the system or component that is opposite or distal the top of the system or component and is facing downward. Unless stated otherwise, "side" describes that an end or direction of the system or component facing in horizontal direction. "Horizontal" or "horizontal orientation" describes that which is in a plane aligned with the horizon. "Vertical" or "vertical orientation" describes that which is in a plane that is angled at 90 degrees to the horizontal.

The following detailed description is directed to technologies for automatically testing remote control units of the type commonly used to control consumer electronics products, such as set-top boxes provided to subscribers by pay television service providers (e.g., cable TV service providers, satellite TV service providers, etc.). A pay television service provider typically provides a set-top box and its associated remote control unit to a subscriber with the expectation that these devices will be returned to the service provider at some point in the future. In most cases, the set-top boxes are leased to subscribers and remain the property of the pay television service provider.

Subscriber equipment, such as remote control units, set-top boxes, or other equipment, may be returned to the service provider for several reasons. In some cases, the equipment fails to work properly and is returned to the service provider when the customer is provided with a replacement. In other cases, a subscriber may want to upgrade the equipment to a newer model or to a model that offers different features. Finally, subscriber equipment is returned to the service provider when a subscriber cancels his or her service and no longer needs the equipment.

Unless the returned equipment is outdated or obsolete, the service provider usually will want to reuse the equipment and provide it to other subscribers. In some cases, this may require that the equipment be repaired, refurbished, and tested to ensure that it works properly and is in good condition. If it is satisfactory, it will be put back into their inventory so that it may be sent to new subscribers, or to existing subscribers who need a replacement or upgrade. This effort to reuse equipment allows the service providers to avoid buying new equipment from their suppliers, thus saving a significant amount of money.

Simple remote control units have limited functionality. In many cases, they work with a single piece of equipment (e.g., the television it was supplied with) and transmit specific IR remote control codes in response to buttons being pressed. For example, they send a code that corresponds to "channel up" in response to the "channel up" button being pressed. Modern remote control units are more sophisticated and offer additional functionality. They are often described as "universal" remote control units, because they are capable of controlling several devices (e.g., cable set-top box, television, Blu-ray player, etc.) In addition to outputting IR remote control codes, they also output radio frequency (RF) remote control codes in response to buttons being pressed in order to allow the remote control units to be used with equipment that is placed in cabinets or behind walls, which interferes with an unobstructed line of sight between the remote control unit and the receiver. A suitable technology for implementing RF technology in remote control units is the Zigbee RF4CE (Radio Frequency for Consumer Electronics) specification published by the Zigbee Alliance, which operates in the 2.4 GHz band according to IEEE 802.15.4, Modern remote control units also incorporate status LEDs that provide a visual indication (e.g., by changing color) of the status of the remote control unit (i.e., whether it has been restored to factory default mode or whether it has been paired with a target device). The buttons also may be backlit to make it easier to use the remote control unit in a dark room. Some of the more sophisticated remote control units also provide a voice control feature and include a microphone that allows them to respond to voice commands spoken by a subscriber. The voice commands may be straightforward (e.g., "watch ESPN") or may involve more complex tasks, like searching for a show by title, by the name of a cast member, etc. A speaker on the remote control unit outputs a tone that indicates whether the voice command was understood by the remote control unit and the associated subscriber equipment.

Before a used remote control unit may be redeployed to a subscriber by the service provider, it can be tested to ensure that it works properly and inspected to ensure that it does not have cosmetic damage that would render it unsuitable for future use. The process of testing a remote control unit may include pressing each button and analyzing the resulting IR or RF remote control codes to determine if they are correct. The other functionality can also be tested, including status lights, button backlighting, the microphone, and the speaker.

Some of the functionality could be tested by a person without the use of sophisticated test equipment. For example, a person can press the buttons on the remote control unit and see if the backlighting is activated. Similarly, a person can enter specific button sequences to reset the remote control unit and see if the status LED changes colors in response. The proper operation of the microphone and speaker may also be verified by a person.

Without some equipment, it is not possible to confirm that the proper IR or RF remote control codes are transmitted in response to the buttons being pushed. Simple, but incomplete, testing can be done using a television receiver or a set-top box. This would allow a person to confirm that the remote control unit is able to turn the device on and off, or change channels, or adjust the volume in response to the corresponding buttons being pressed. However, sophisticated remote control units include a database or library of remote control codes that allow them to be used with multiple brands and models of set-top boxes, televisions, and other consumer electronics products. It is not possible to test all of these remote control codes without having multiple televisions, set-top boxes, etc. available. Furthermore, it would take a significant amount of time for a person to thoroughly test a remote control unit using this method.

Instead of settling for incomplete testing or assembling the collection of equipment needed to test most of the remote control unit's IR functionality, it is possible to use an IR remote control unit decoder/tester that is capable of receiving and decoding IR remote control codes and displaying the codes it receives on its display for visual confirmation by a user. Several models are available from various sources, including the Generic Universal TV IR Remote Control Decoder Tester available from amazon.com. Although these devices are capable of recognizing a large number of remote control codes, they still require considerable human effort and time to confirm that the code that is displayed on the tester is the code that is supposed to correspond with the pressed button.

In order to overcome these obstacles and provide a system that is capable of quickly and thoroughly testing the functionality of remote control units, embodiments described in the present disclosure feature a test station that employs various features to perform the appropriate testing. The test station includes a test fixture that holds the remote control unit securely in place so that the buttons on the remote control unit are aligned with actuators (e.g., solenoids) that are configured to press the buttons in response to signals from a controller. The test station can comprise IR and RF receivers that receive the remote control codes that are transmitted by the remote control unit when each button is pressed. The test station also includes light sensors, a speaker, and a microphone in order to test the other functionality of the remote control unit. These features allow a sophisticated remote control unit to be tested automatically, quickly, and thoroughly, and its condition accurately ascertained so that it may be reused if it is functioning properly.

Figure 1A:
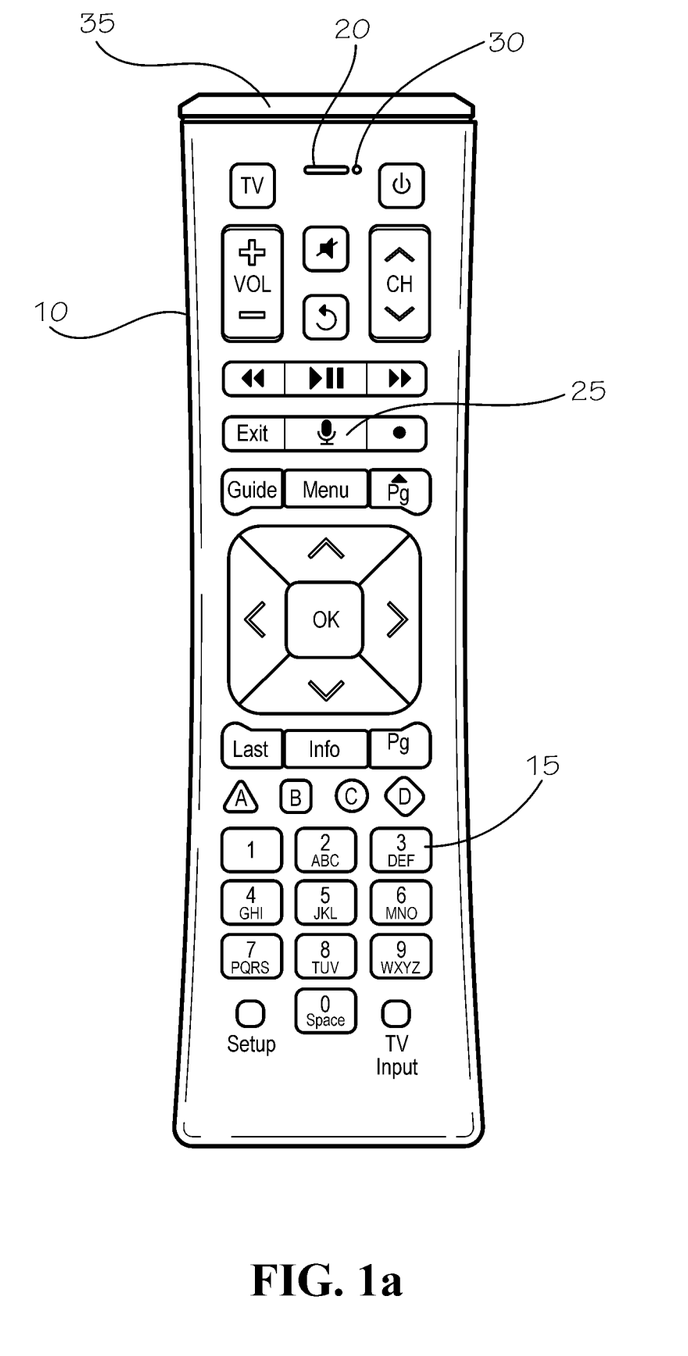
FIG. 1a is a front view of an exemplary remote control unit for consumer electronics products, such as a set-top box associated with a pay television service, according to embodiments that are described herein.
Figure 1B:
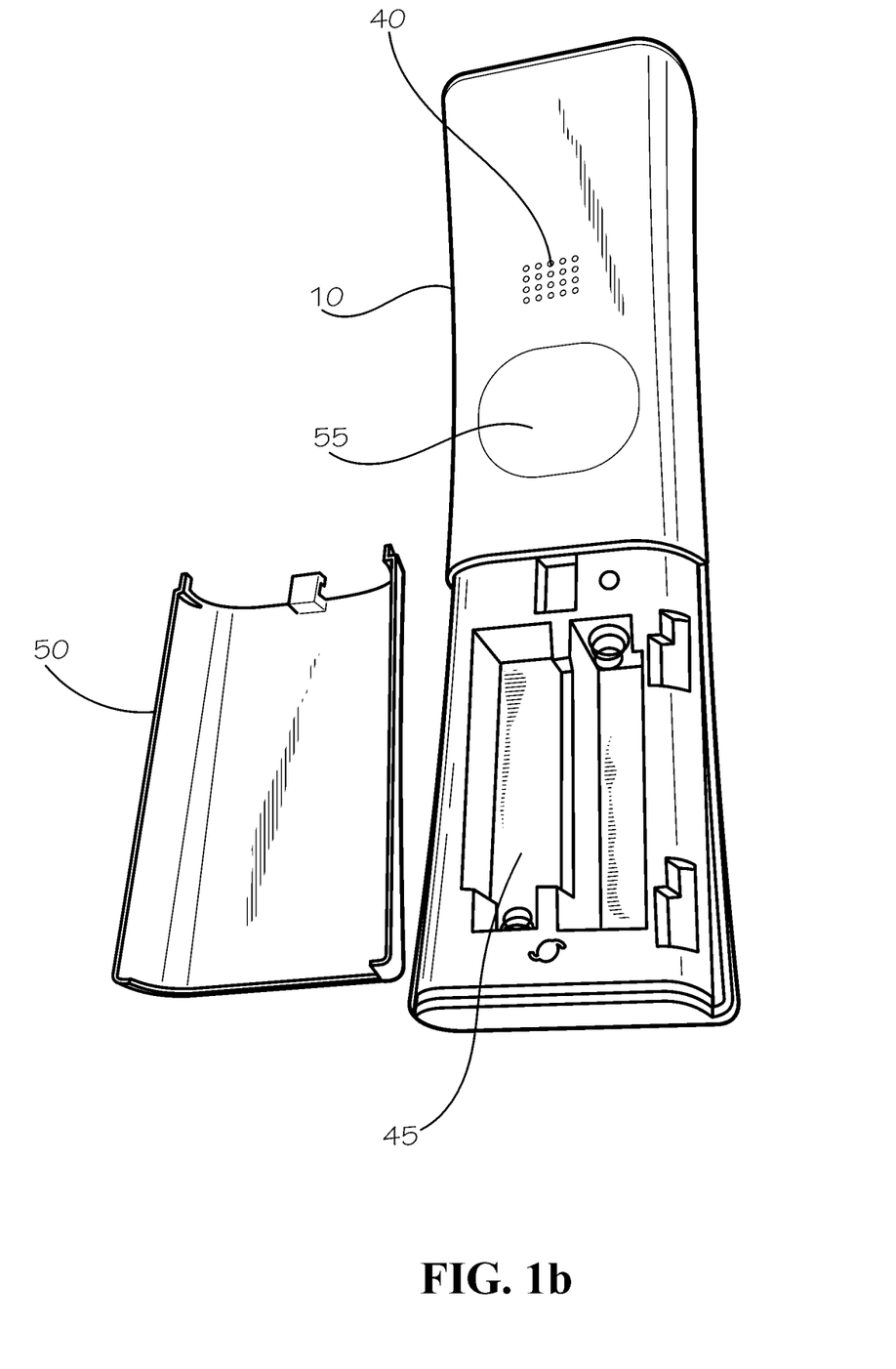
FIG. 1b is a rear view of the exemplary remote control unit of FIG. 1a, and shows a battery compartment and other features that are found on a rear of the remote control unit.

FIGS. 1a and 1b illustrate a remote control unit 10 of the type commonly used with consumer electronics products, such as a set-top box provided by a pay television service provider. FIG. 1a is a front view of remote control unit 10 and depicts several features of the device. The remote control unit 10 includes a plurality of keys or buttons 15 that are associated with the functions that may be executed using the remote control unit 10. The remote control unit 10 depicted in FIG. 1 includes 41 buttons (note that Vol +/− and Ch /\/\/ are each counted as two since each button toggles about its center line). Some of the buttons are used to turn power to a TV or to the set-top box on or off. Other buttons are available to control volume up/down and channel up/down. Those skilled in the art will appreciate that other buttons may be used to control streaming video, navigate menus, select options, enter channel numbers, etc. Although most remote control units offer similar functionality, the number of buttons on a remote control unit, and the functions associated with those buttons, vary among the different makes and models of remote control units. In addition, those skilled in the art will appreciate that some remote control units (such as the Philex SLx RC050 remote control) can employ touch screens or other types of displays in place of some or all of the conventional buttons or keys shown on the remote control unit 10 in FIG. 1, and that the features and advantages of the present disclosure may be modified and adapted to work with touch screen displays and the buttons displayed on them.

Other features of remote control unit 10 are shown in FIG. 1. A microphone button 25 may be used to enable the remote control unit 10 to accept voice commands via a microphone 30. A top of the remote control unit 10 has an IR lens 35, which protects an IR LED transmitter located beneath it while allowing the IR signals emitted by the IR LED located under the IR lens to pass through the lens with minimal attenuation or interference. A status LED 20 indicates that status of the remote control unit. The buttons 15 may be backlit in order to facilitate use of the remote control unit in a dark environment.

FIG. 1b is a rear view of the remote control unit 10 and illustrates additional features of the remote control unit 10. Remote control unit 10 includes a speaker 40. It also includes a battery compartment 45, which holds two AA batteries and normally is covered by battery cover 50. The remote control unit may also include a recessed area 55, which may make it easier for a user to orient and hold the remote control unit in his or her hand. Those skilled in the art will appreciate that speaker 40 may be a conventional speaker or any other audio output device capable of producing a suitable tone or sound.

Figure 2:
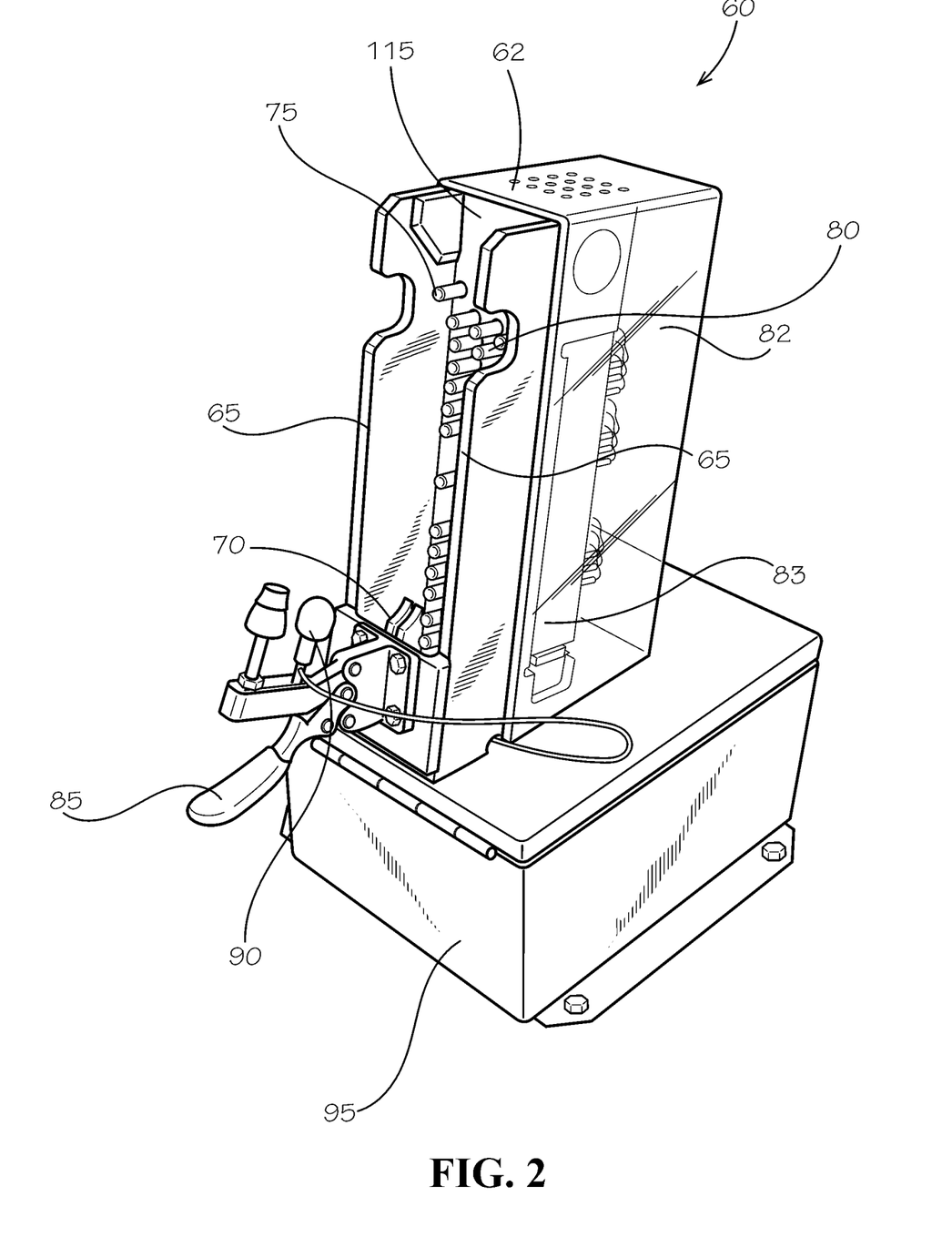
FIG. 2 is a perspective view of a test station for testing the remote control unit of FIG. 1, according to embodiments that are described herein.

FIG. 2 is a perspective view of a test station 60 for testing remote control unit 10 of FIG. 1. The test station is designed to receive remote control unit 10 (as shown in FIGS. 7-10) and hold it securely in place during the testing process. The test station 60 includes a test fixture 62 and a control box 95. The test fixture 62 includes side walls 65, which form a chamber or cavity for the remote control unit 10. The width of the chamber coincides with the specific remote control units to be tested. A bottom of the chamber can include at least one support 70, such as a set screw, which forms a bottom surface on which the remote control unit rests while in the test fixture 62. As shown more clearly in FIGS. 7-10, the remote control unit 10 is inserted upside down (i.e., with the IR lens 35 resting on support 70 and pointing downward) with the buttons 15 facing an interior face 72 (shown in FIG. 3) of the actuator plate 115. The front surface of the remote control unit 10 is supported by set screws 75, which provide fixed points of reference for the remote control unit 10 and maintain the proper spacing between the actuators and the buttons.

Figure 3:
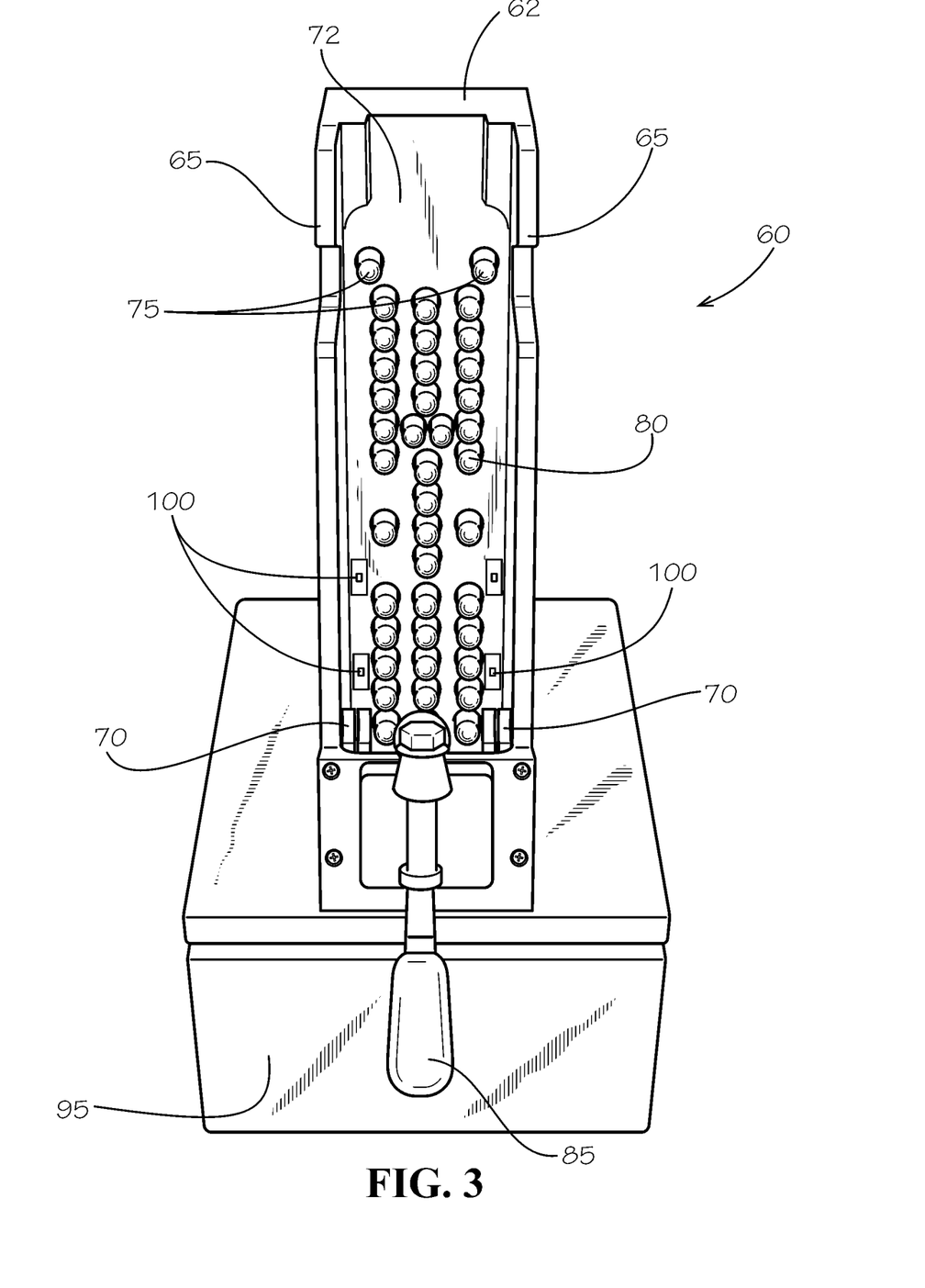
FIG. 3 is a front view of the test station of FIG. 2.

FIG. 3 shows that interior face 72 of the test fixture also includes a plurality of actuators 80, which are capable of pressing the buttons on the remote control unit in response to a signal from a controller (not shown). Those skilled in the art will appreciate that an actuator is, generally speaking, a component of a machine that is responsible for moving a mechanism. There are four main types of actuators, including electrical, hydraulic, pneumatic, and mechanical. An actuator's motion may be linear or rotational. In the present disclosure, the actuators can be electrical, tubular, linear solenoids, which may be easily controlled by electrical signals from a controller.

The test fixture can include an actuator that is positioned as needed to press each of the remote control unit's buttons that will be tested. If, for some reason, a button on the remote control unit does not need to be tested, the test fixture does not need to provide an actuator for that button. A toggle clamp 85 may be used to clamp the remote control unit in place so that it is properly aligned with the actuators 80 and held firmly enough that the actuators are able to reliably press the buttons 15 without pushing the entire remote control unit backward away from the actuators. The design of the test fixture 62, including the side walls 65, supports 70, set screws 75, and toggle clamp 85 are such that the remote control unit can be held firmly in position where the buttons are aligned with the actuators 80.

The design parameters for the test fixture can depend on the size, shape and features of the remote control unit to be tested. Buttons on the remote control unit come in a variety of sizes and shapes. Some may be very small. Some may be positioned very close together. Consequently, the arrangement between the test fixture and the remote control unit under test may be quite precise. Those skilled in the art will appreciate that sufficient precision can be obtained by a variety of methods, including close tolerances on the width of the chamber formed by the test fixture's side walls relative to the width of the remote control unit under test, the positioning of the supports in the bottom of the test fixture, the positioning of the set screws, and the positioning of the toggle clamp that is used to secure the remote control unit in the test fixture.

As shown in FIG. 2, the test fixture 62 can also comprise a cover 82 that can be configured to protect the portions of the actuators that protrude out the back of the actuator plate 115. At least one printed circuit board 83 may be mounted on the test fixture and form part of the circuit that controls the actuators 80. The cover 82 preferably is made of clear plastic to allow the operator to observe the operation of the actuators. However, those skilled in the art will appreciate that this is not necessary and that the cover 82 can be made of other suitable materials, or omitted entirely.

In addition to the aforementioned elements, FIG. 2 shows a test fixture microphone 90, which can be attached to the toggle clamp 85 and capable of picking up sounds emitted by the speaker 40 on the back of the remote control unit. The test fixture also includes a fixture speaker 110 (FIG. 5) that provides audio input for the remote control unit's microphone 30. The test station 60 can also include receivers 175, 180 (FIG. 10) configured to receive the IR and RF remote control codes transmitted by remote control unit 10 in response to buttons being pressed by the actuators 80. In order to test the remote control unit's status LED and button backlighting, the test fixture 62 can include at least one light detector or light sensor 100 (shown in FIG. 3) positioned on the interior face 72 of the test fixture 62. The test fixture rests on control box 95, which houses a controller 170 (FIG. 10) that is capable of generating signals to control the actuators 80 and fixture speaker 110 and to receive signals from the light sensors 100 and the fixture microphone 90 and from the IR and RF receivers 175, 180. The IR receiver 175 may be located adjacent the supports 70 or further down in the control box 95, provided that there is a clear line of sight between the remote control unit's IR lens 35 and the IR receiver. The RF receiver 180 may be located anywhere in the test station 60 since it does not rely on an unobstructed line of sight between it and the remote control unit.

FIG. 3 also illustrates some of the light sensors 100 that can be mounted on the interior face 72 of the test fixture 62 for the purpose of determining whether the button backlighting is working. The supports 70 can include discrete supports positioned near the side walls 65 and made of metal, plastic, or other suitable materials. Alternatively, supports 70 can be replaced with a shelf made of clear plastic, Plexiglas, or some other material that allows the IR signals to pass through it.

Figure 4:
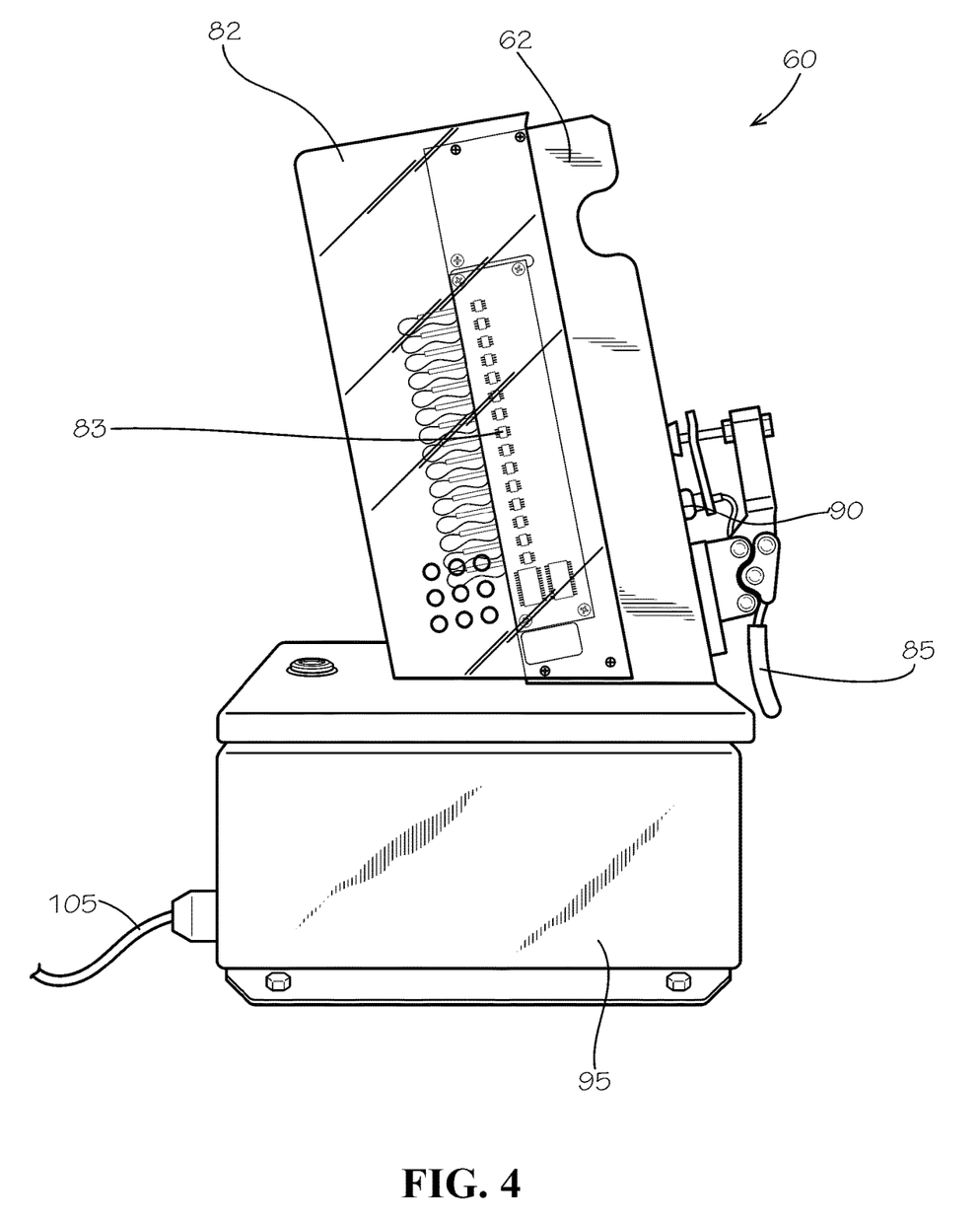
FIG. 4 is a side view of the test station of FIG. 2.

FIG. 4 is a side view of the test station 60, which includes test fixture 62 and control box 95. The test station 60 can be powered by a power cord 105 that is plugged into the control box 95. The test fixture 62 is mounted on the control box 95 at an angle in order to assist in the proper placement and positioning of the remote control unit 10 in the test fixture. Those skilled in the art will appreciate that mounting the test fixture at a slight angle instead of vertically is beneficial because it allows the remote control unit to remain in position after it has been placed in the test fixture and before the toggle clamp 85 is engaged in order to secure the remote control in place.

Figure 5:
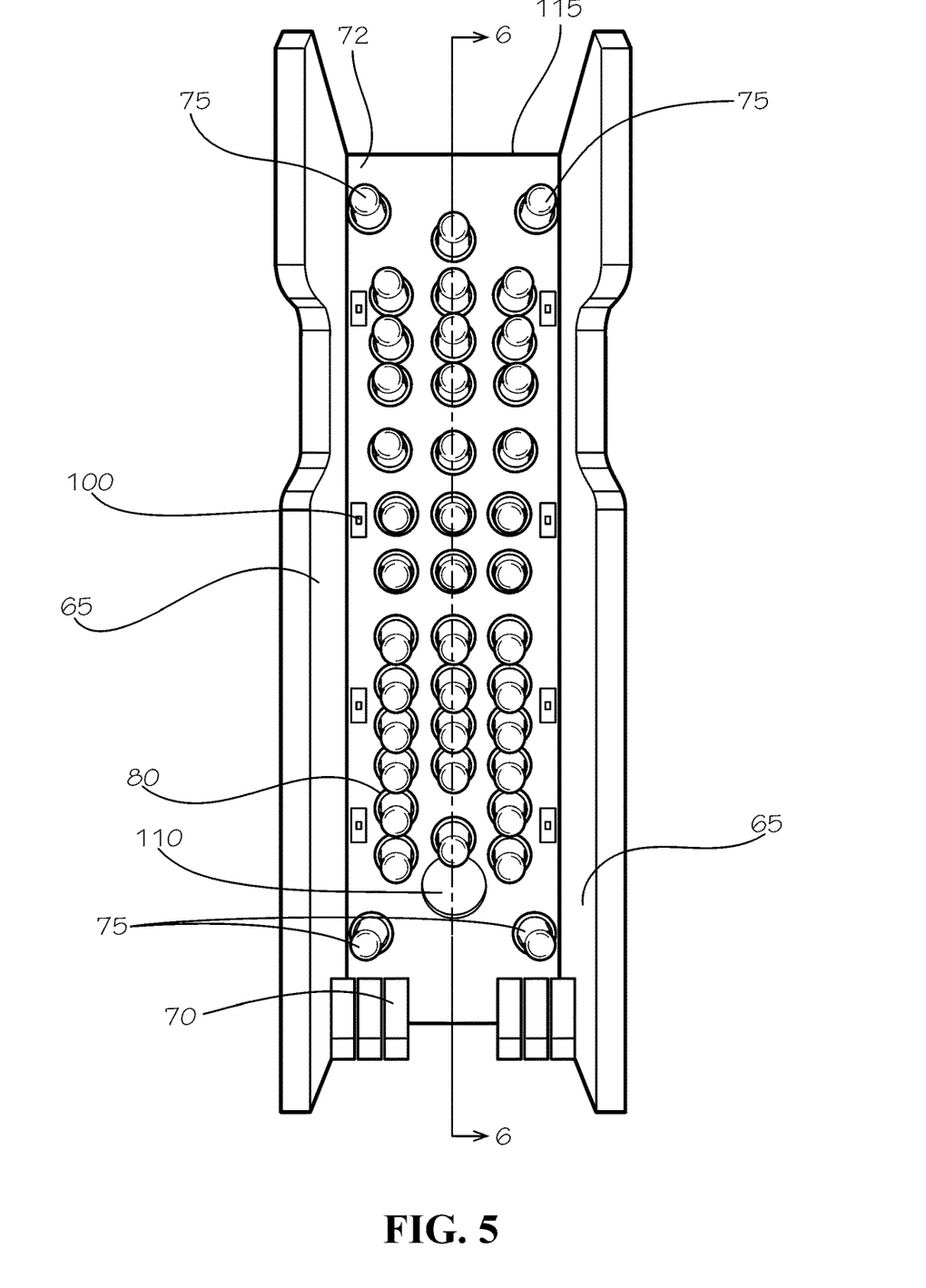
FIG. 5 is a front view of an actuator plate that forms a part of the test station of FIG. 2.

FIG. 5 is a front view of a portion of the test fixture 62. FIG. 5 provides an unobstructed view of the actuator plate 115, side walls 65, supports 70, interior face 72, set screws 75, actuators 80, and multiple light sensors 100. The test fixture also includes a fixture speaker 110 that is positioned adjacent the remote control unit's microphone 30 (when the remote control unit is properly positioned in the test fixture). In an exemplary embodiment, the light sensors can each be a VEML6040 RGBW Color Sensors with I2C Interface, manufactured by Vishay Intertechnology, Inc., or any other light sensor that is small enough and sensitive enough to operate in this setting. Those skilled in the art will appreciate that it is possible to detect the presence of the backlighting without having one light sensor for each backlit button. In this embodiment, one light sensor 100 can be positioned adjacent the remote control unit's status LED, and other light sensors 100 can be positioned around the test fixture's interior face 72 in a manner sufficient to determine if the backlight function is working. The number and placement of the light sensors may vary depending on the light-related features on the remote control unit and need to test those features.

Figure 6:
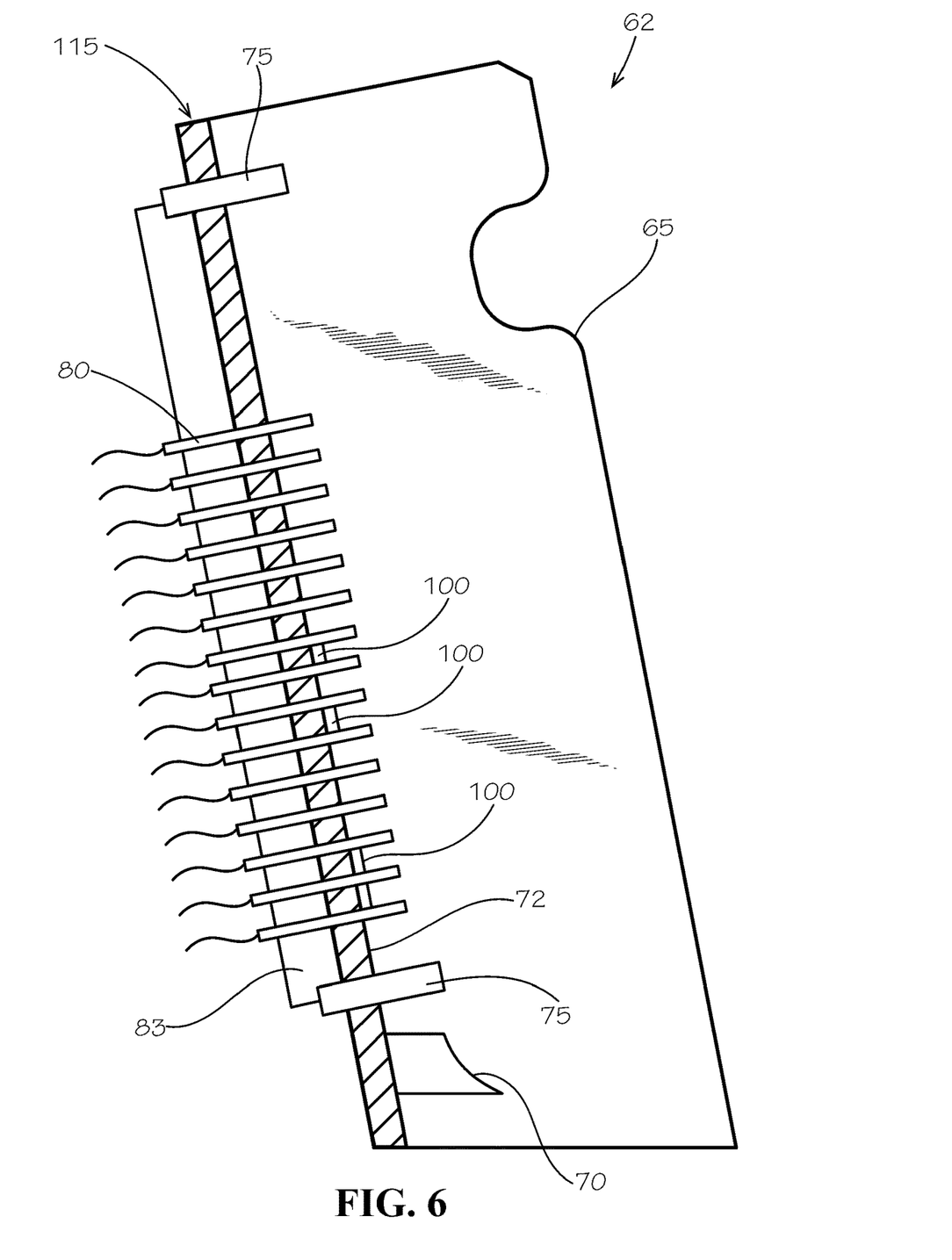
FIG. 6 is a cross-sectional view of the actuator plate taken along the line 6-6 in FIG. 5.

FIG. 6 is a cross-sectional view of an actuator plate 115 of the test fixture 62 taken along the line 6-6 in FIG. 5. As described previously, the test fixture 62 includes the interior face 72 of the actuator plate 115, set screws 75, actuators 80, side walls 65, printed circuit board 83, light sensors 100, and speaker 110. In this embodiment, the actuators 80 can be tubular push solenoids mounted in holes in the actuator plate 115. The positioning of the solenoids can be such that when the remote control unit is placed in the test fixture, the surface of the solenoids 80 may be in contact with, but not depress, the buttons on the remote control unit when the solenoids are in their un-actuated or un-energized state. It is possible that some of the buttons on the remote control unit may be different heights than other buttons 15 on the remote control unit. Thus, the placement of the solenoids in a test fixture will depend on the features of the specific remote control units to be tested in that text fixture. The stroke (i.e., the distance the solenoid's piston travels), force, and timing of the solenoids (when actuated) will be determined by the specifications or requirements for the particular buttons on the specific remote control units that will be tested. For example, actuating a solenoid for a brief period of time (for example, 200 milliseconds) may be sufficient to test most buttons and their associated commands. However, a solenoid may need to be actuated for several seconds to confirm that buttons associated with commands like channel up/down or volume up/down repeat when those buttons are pressed and held. Custom solenoids may be specified and obtained if the features of the remote control units under test require some combination of size, force, and stroke that is not readily available in a standard part.

Figure 7:
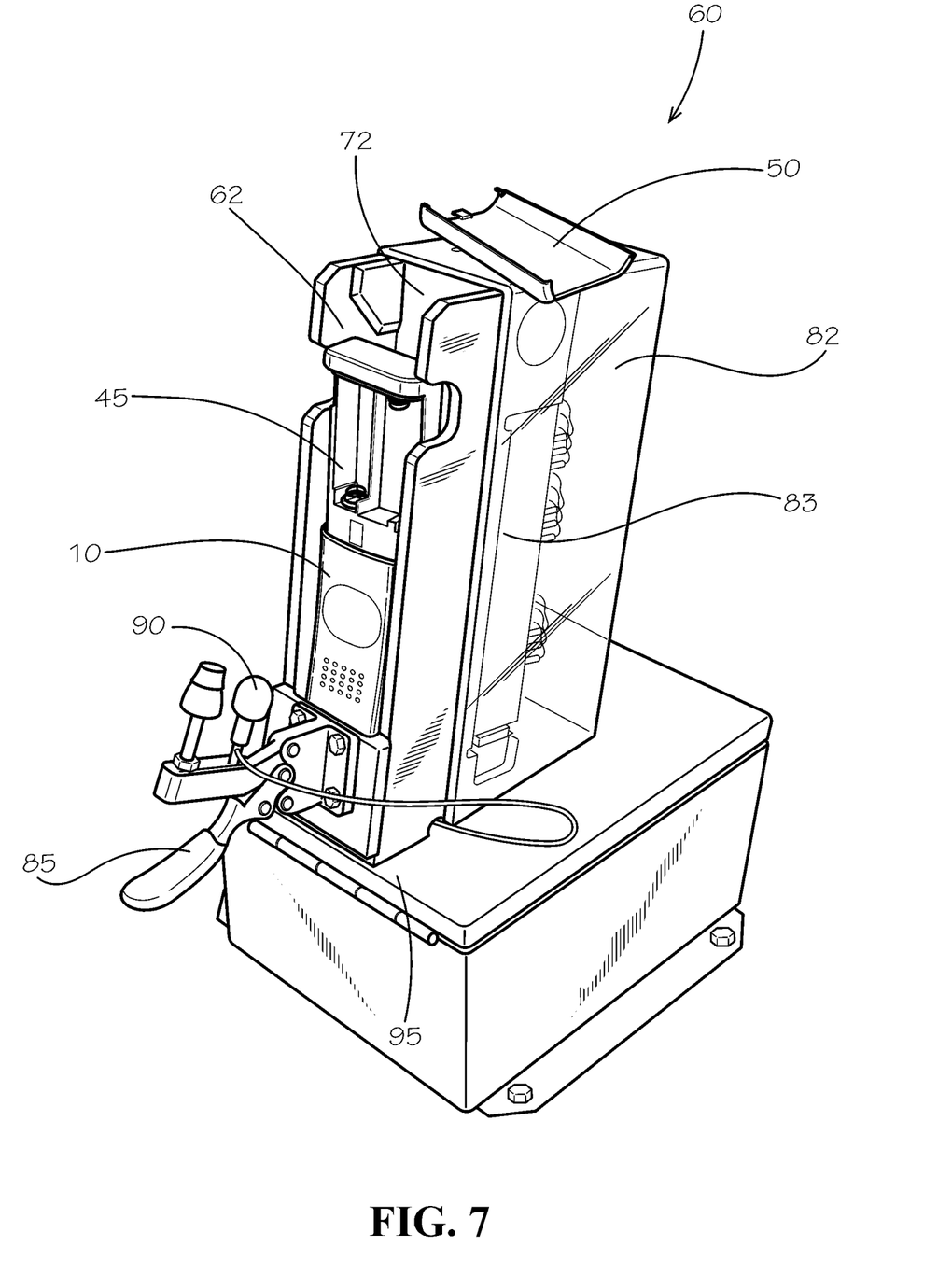
FIG. 7 is a perspective view of the test station of FIG. 2 with the remote control unit of FIG. 1 inserted in the test fixture.

FIGS. 7-10 illustrate how a remote control unit 10 is positioned and secured in the test station 60 and how power is supplied to the remote control unit 10 during testing. In FIG. 7, the remote control unit 10 has been inserted into the test fixture 62 so that the IR lens 35 (shown in FIG. 1a) is facing downward and the buttons 15 (shown in FIG. 1a) are facing toward the interior face 72 of the actuator plate 115 so that the buttons are adjacent the actuators 80. The battery cover 50 has been removed so that the battery compartment 45 is exposed. In this view, the toggle clamp 85 has not been locked into place. The fixture microphone 90, cover 82, printed circuit board 83, and control box 95 are also shown.

Figure 8:
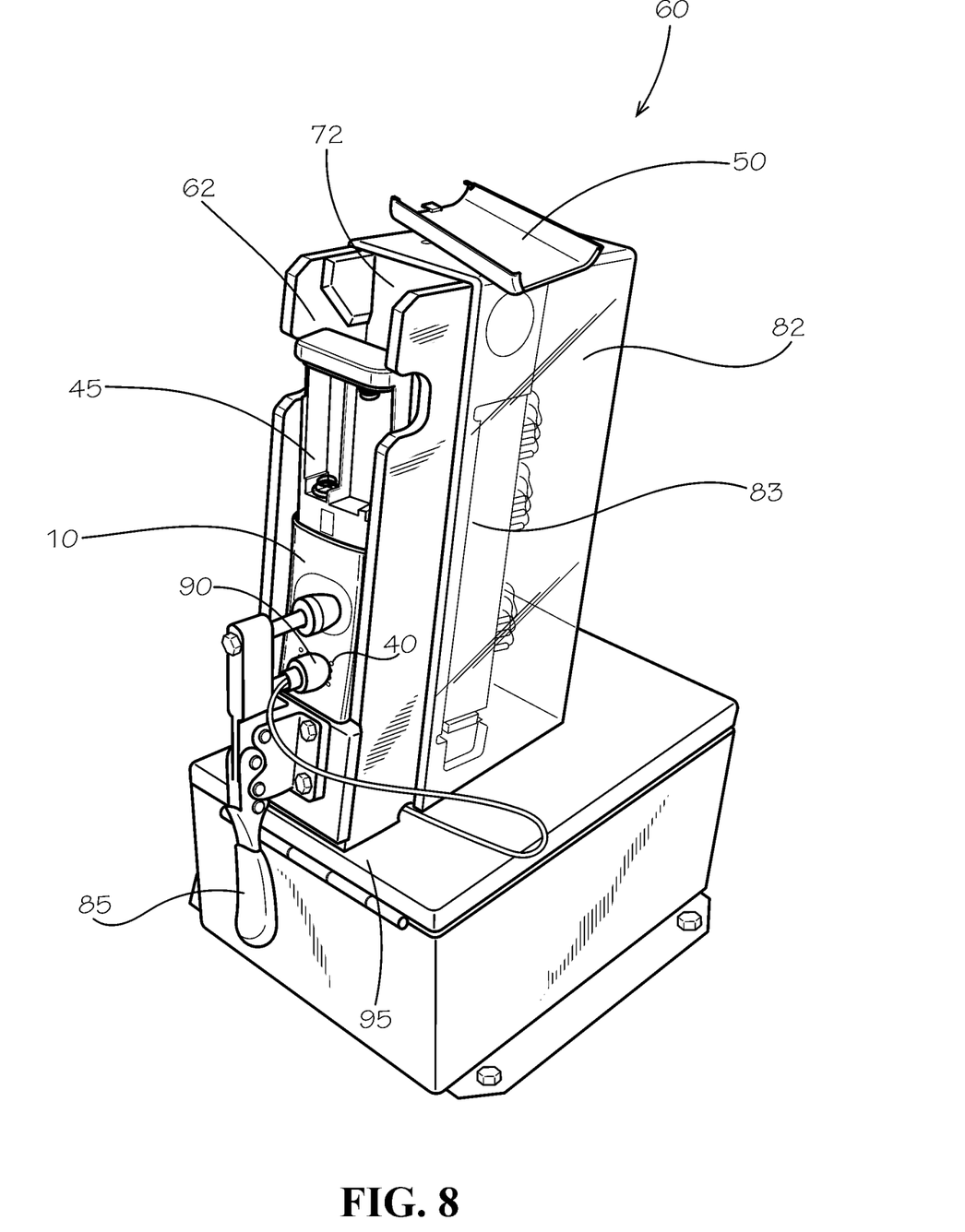
FIG. 8 is a perspective view of the test station of FIG. 2 with the remote control unit of FIG. 1 inserted in the test fixture and the toggle clamp closed to hold the remote control unit in place.

FIG. 8 shows the same features as FIG. 7, but with the toggle clamp 85 locked into place. The action of the toggle clamp can press the remote control unit firmly up against the set screws 75 (shown in FIG. 2) and can ensure that the position of the buttons relative to the solenoids (actuators 80) is appropriate. It also ensures that the remote control unit remains in position when the actuators press the buttons. When the toggle clamp 85 is locked into place, the fixture microphone 90 can be simultaneously moved into position adjacent the speaker 40 on the back of remote control unit 10.

Figure 9:
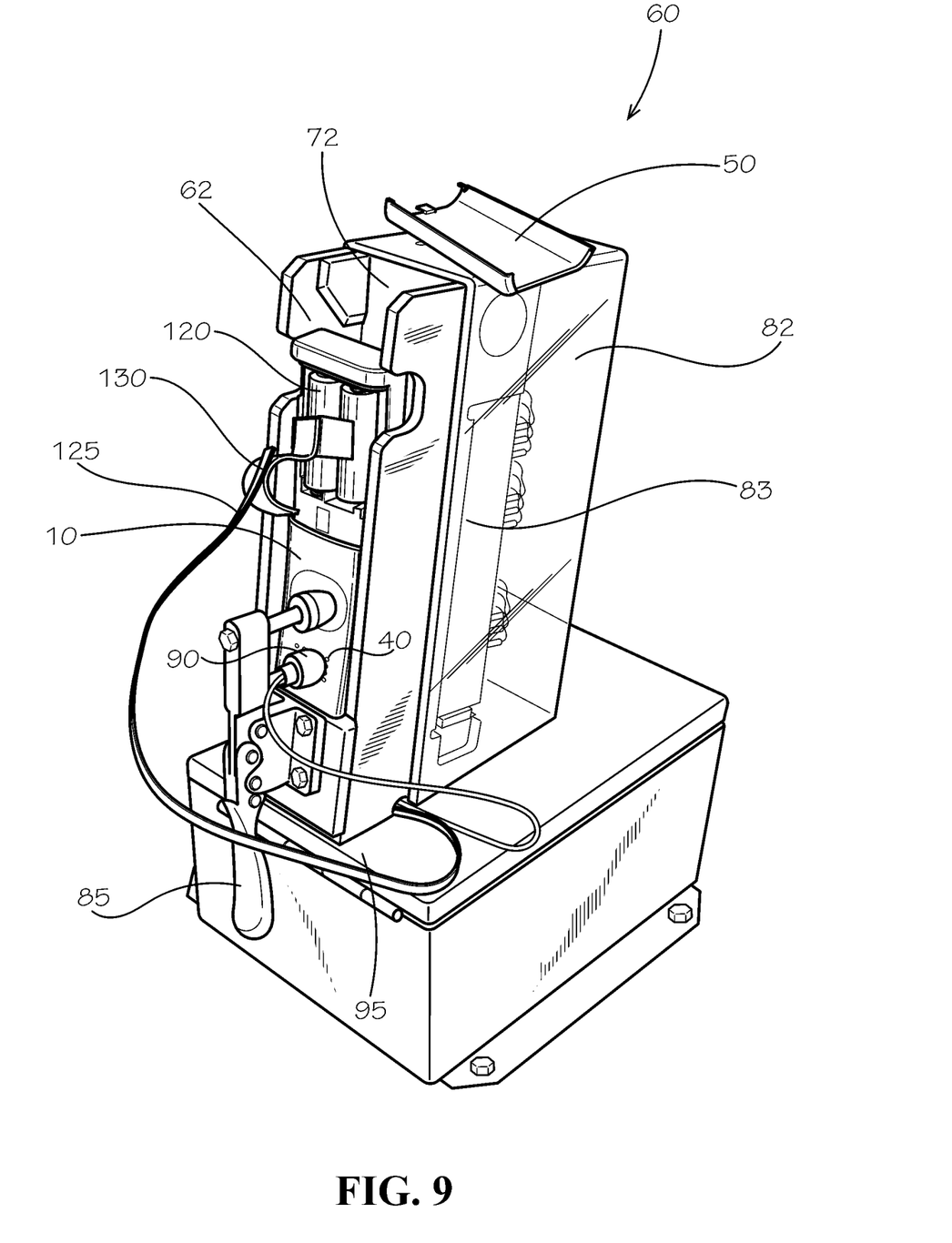
FIG. 9 is a perspective view of the test station of FIG. 2 with the remote control unit of FIG. 1 inserted in the test fixture, the toggle clamp closed, and a line-powered battery pack simulator inserted in the battery compartment of the remote control unit.

FIG. 9 shows the same features as FIG. 8, but with the addition of a line-powered battery pack simulator 120. Remote control units typically require one or more AA or AAA batteries in order to operate. Line-powered battery pack simulators or battery pack replacements are known in the art and are used to provide a line-powered alternative to disposable batteries. These battery pack simulators provide a power source with the same form and fit as AA or AAA sized "batteries" that fit into normal battery compartments, but they are powered by a cord 125 that runs to a power supply. The power supply may plug into an AC wall outlet, or power to the cable may be supplied by circuitry in the control box 95, in which case the control circuitry can control power (i.e., turn power on or off) to the remote control unit under test. The battery pack simulator 120 of the present disclosure is configured as two AA batteries and supplies approximately 3 volts DC to the remote control unit. The battery pack 120 also employs a handle 130 to facilitate the operator's insertion of the battery pack 120 at the beginning of the testing and removal of the battery pack 120 when testing is completed.

Figure 10:
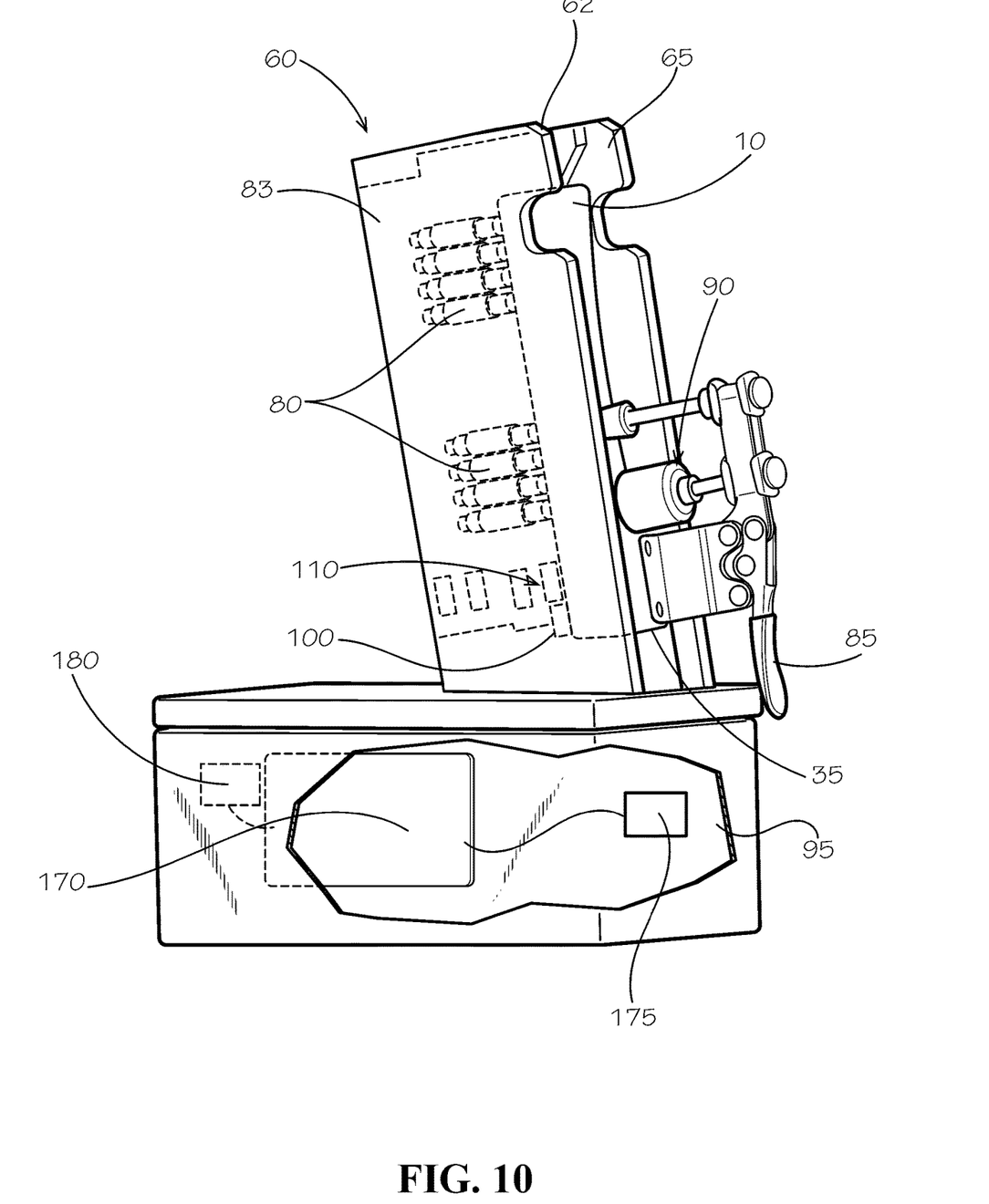
FIG. 10 is a cutaway view of the test station of FIG. 2 showing the relationship between the remote control unit and the features of the test station.

FIG. 10 is a partial cutaway view of the test station of FIG. 2 that shows additional aspects of the relative positions of the remote control unit 10 and the features of the test station 60. As described early, but shown more clearly here, the remote control unit 10 is positioned in the test fixture 62 with the IR lens 35 facing downward and the buttons facing the actuators 80. As more clearly shown in this figure, the test fixture speaker 110 is located adjacent the remote control unit's microphone 30 and one of the light sensors 100 is located adjacent the remote control unit's status LED 20.

The exterior of the control box 95 is cut away to show components that may be internal to the control box 95. In this embodiment, a controller 170, such as a Raspberry Pi computer, can be mounted inside the control box 95, and is connected to an IR receiver 175 and an RF receiver 180. The IR receiver 175 can be located below the IR lens 35 of the remote control unit 10. It may be positioned close to the IR lens 35 or further down in the control box 95, as long as the path between the IR lens and the IR receiver is not obstructed. A representative IR receiver 175 is the TSOP38238 IR Receiver Module for Remote Control Systems, manufactured by Vishay Intertechnology or other, similar device. The RF receiver 180 may be a RF4CE-compatible dongle, such as the CC2531EMK USB dongle evaluation module kit, which provides a USB interface to 802.15.4/Zigbee applications and is manufactured by Texas Instruments Incorporated. The position of the RF receiver 180 is not critical since the remote control unit's RF transmissions are not directional and do not require an unobstructed line of sight. Those skilled in the art will appreciate that while RF4CE is the standard that is most commonly used in remote control devices, other wireless or RF standards are available. For example, Wi-Fi Direct and Bluetooth may be used. The receiver or receivers that are used in the test station can be selected based on the functionality of the remote control unit that is being tested.

Figure 11:
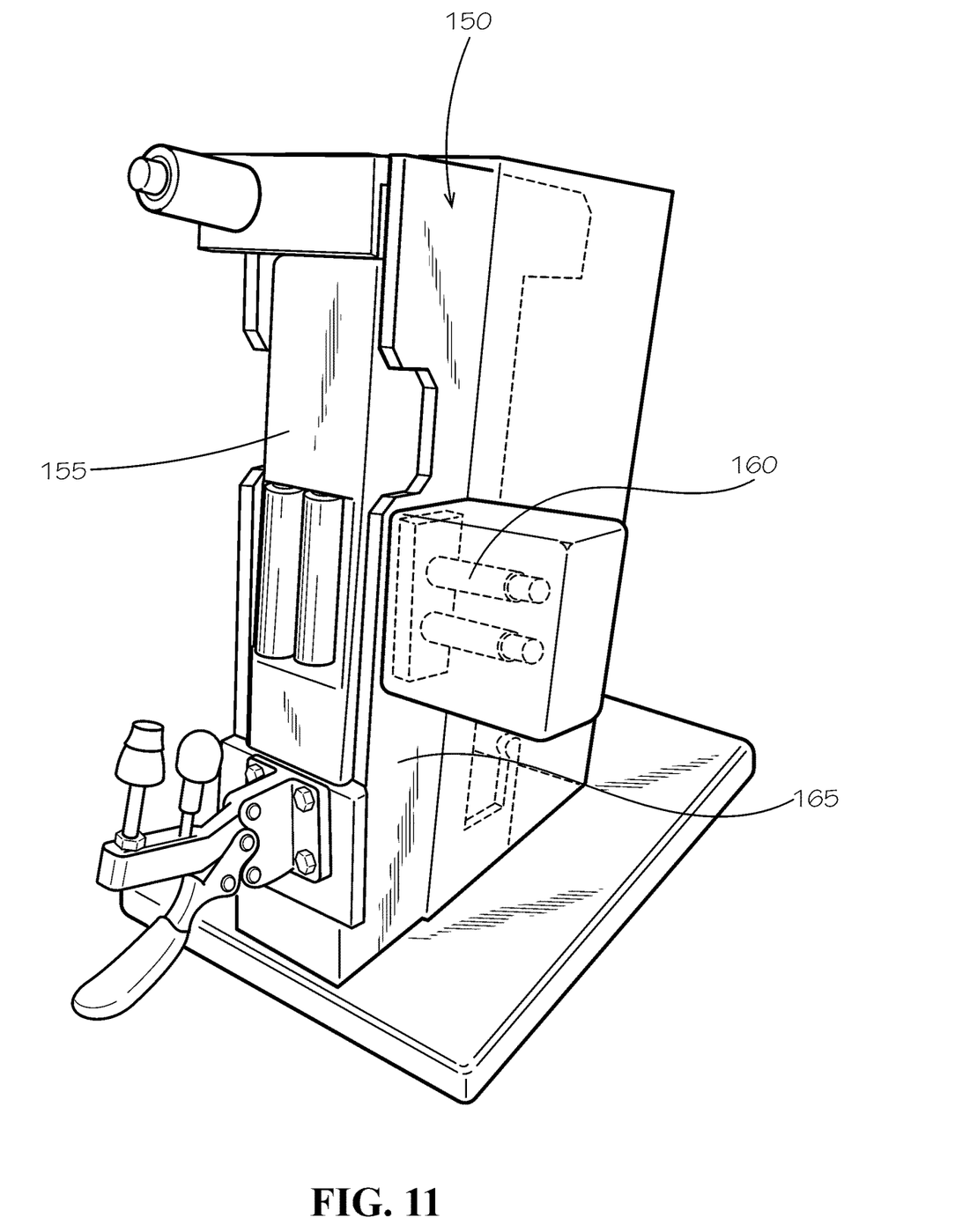
FIG. 11 is a perspective view of an alternative embodiment of a test station for testing remote control units that include buttons on at least one side, according to embodiments described herein.

FIG. 11 is a perspective view of an alternative embodiment of a test fixture 150. In this embodiment, test fixture 150 is designed to test a remote control unit 155 that has buttons on its sides, in addition to the buttons on its front face. In order to accommodate remote control unit 155, test fixture 150 includes actuators 160 that are mounted through a side wall 165 of test fixture 150 and positioned adjacent the buttons on the side of the remote control unit 155. Those skilled in the art will appreciate that test fixture 150 is similar in other respects to the test fixture 62 discussed above, and that these embodiments are examples of how the actuators, speakers, microphones, and light sensors may be positioned in various places on the test fixture 150 in order to accommodate the features of the specific type of remote control unit to be tested.

Those skilled in the art will appreciate how the present disclosure and the embodiments described herein provide a test station 60 and test fixture 62 that are capable of testing multiple functions on a remote control unit 10. The components of the test fixture 62 can be controlled by a controller 170 that runs a test script or routine that causes the components of the test fixture 62 to provide the desired inputs to the remote control unit, and to collect and analyze the outputs from the remote control unit 10. In the embodiments disclosed herein, the inputs include the button presses from the actuators 80 and audio tones from the speaker 110. The outputs include IR and RF remote control codes, the status LED 20, the button backlights, and speaker output. An exemplary controller and routine for executing such testing is disclosed in the co-pending applications cited above in the Cross-Reference to Related Applications, which are incorporated herein in their entireties. In light of the foregoing discussion, those skilled in the art will appreciate that a test station that has been used to test one model of remote control unit may be reconfigured to test a different model by replacing the text fixture with a new, appropriate test fixture, and causing the controller in the control box to execute a test routine compatible with the new text fixture and the new model of remote control unit.

Although several aspects have been disclosed in the foregoing specification, it is understood by those skilled in the art that many modifications and other aspects will come to mind to which this disclosure pertains, having the benefit of the teaching presented in the foregoing description and associated drawings. It is thus understood that the disclosure is not limited to the specific aspects disclosed hereinabove, and that many modifications and other aspects are intended to be included within the scope of any claims that can recite the disclosed subject matter.

The logical operations, functions, or steps described herein as part of a method, process or routine may be implemented (1) as a sequence of processor-implemented acts, software modules, or portions of code running on a controller or computing system and/or (2) as interconnected machine logic circuits or circuit modules within the controller or computing system. The implementation is a matter of choice dependent on the performance and other requirements of the system. Alternate implementations are included in which operations, functions or steps may not be included or executed at all, may be executed out of order from that shown or discussed, including substantially concurrently or in reverse order, depending on the functionality involved, as would be understood by those reasonably skilled in the art of the present disclosure.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily comprise logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which comprise one or more executable instructions for implementing specific logical functions or steps in the process, and alternate implementations are included in which functions may not be included or executed at all, can be executed out of order from that shown or discussed, including substantially concurrently or in reverse order, depending on the functionality involved, as would be understood by those reasonably skilled in the art of the present disclosure. Many variations and modifications can be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

What is claimed is:

1. A test fixture for testing a remote control unit, comprising
    an actuator plate;
    a plurality of actuators extending perpendicular from the actuator plate and configured to press a plurality of buttons on a remote control unit, each actuator corresponding to a different button of the plurality of buttons on the remote control unit;
    a plurality of supports extending from the actuator plate, the plurality of supports extending parallel to the plurality of actuators and configured to engage a front surface of the remote control unit;
    a pair of side walls perpendicular to the actuator plate and defining the sides of a chamber having a width corresponding to the width of the remote control unit;
    a clamp for engaging a back surface of the remote control unit and for holding the remote control unit in the chamber when the clamp is in a closed position by pressing the front surface of the remote control unit against the plurality of supports;
    a microphone attached to the clamp and positioned adjacent a speaker on the back surface of the remote control unit when the remote control unit is in the chamber and the clamp is in the closed position;
    a receiver for receiving remote control codes transmitted by the remote control unit in response to the pressing of one of the plurality of buttons by a corresponding one of the plurality of actuators;
    a plurality of light sensors mounted on the actuator plate and configured to detect the presence of light emanating from the buttons on the remote control unit; and
    a powered battery pack configured to supply power to the remote control unit via a battery compartment on the back surface of the remote control unit.

2. The test fixture of claim 1, wherein the actuators are solenoids.

3. The test fixture of claim 1, wherein the receiver is an infrared receiver configured to receive infrared remote control codes transmitted by the remote control unit.

4. The test fixture of claim 1, wherein the receiver is a radio frequency receiver configured to receive radio frequency remote control codes transmitted by the remote control unit.

5. The test fixture of claim 1, further comprising a light sensor mounted on the actuator plate and positioned adjacent a status LED on the front surface of the remote control unit and configured to detect the color of the status LED.

6. The test fixture of claim 1, further comprising:
    a speaker mounted on the actuator plate and positioned adjacent a microphone on the front surface of the remote control unit and configured to provide audible tones to the microphone.

* * * * *